United States Patent
Sebeni et al.

(10) Patent No.: US 9,942,873 B2
(45) Date of Patent: Apr. 10, 2018

(54) CONCURRENT DATA COMMUNICATION AND VOICE CALL MONITORING USING DUAL SIM

(71) Applicant: Apple Inc., Cupertino, CA (US)

(72) Inventors: Johnson O. Sebeni, Fremont, CA (US); Li Su, San Jose, CA (US); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 14/807,306

(22) Filed: Jul. 23, 2015

(65) Prior Publication Data

US 2016/0029345 A1    Jan. 28, 2016

Related U.S. Application Data

(60) Provisional application No. 62/029,415, filed on Jul. 25, 2014.

(51) Int. Cl.
*H04J 3/00* (2006.01)
*H04W 68/02* (2009.01)
(Continued)

(52) U.S. Cl.
CPC .......... *H04W 68/02* (2013.01); *H04B 1/7115* (2013.01); *H04L 5/14* (2013.01);
(Continued)

(58) Field of Classification Search
None
See application file for complete search history.

(56) References Cited

U.S. PATENT DOCUMENTS

2003/0235167 A1    12/2003  Kuffner
2004/0166882 A1*   8/2004   He ...................... H04W 68/00
                                                                455/460

(Continued)

FOREIGN PATENT DOCUMENTS

EP    2605563 A1    6/2013

OTHER PUBLICATIONS

Office Action for ROC (Taiwan) Patent Application No. 104124151, dated Jun. 27, 2016, pp. 1-10.
(Continued)

*Primary Examiner* — Mohammad Anwar
*Assistant Examiner* — Angel Brockman
(74) *Attorney, Agent, or Firm* — Meyertons Hood Kivlin Kowert & Goetzel, P.C.; Jeffrey C. Hood; Matthew C. Washburn

(57) ABSTRACT

Performing concurrent data communication and voice call monitoring using a single cellular radio. According to some embodiments, the UE may perform data communication, via the radio, using a first RAT, supported by a first SIM. The UE may also perform paging functions for a voice communication, via the radio, using a second RAT, supported by a second SIM. In some scenarios, the first and second RATs are the same. The data communication and the paging functions may be performed concurrently using shared physical layer resources. For example, the shared physical layer resources may comprise a shared software defined radio (SDR) configured to demodulate and/or decode signals of the data communication and the paging function. As another example, the shared physical layer resources may comprise a shared Rake receiver configured to demodulate signals of the data communication and the paging function.

20 Claims, 7 Drawing Sheets

(51) Int. Cl.

| | | |
|---|---|---|
| *H04B 1/7115* | (2018.01) | |
| *H04L 5/14* | (2006.01) | |
| *H04W 72/12* | (2009.01) | |
| *H04W 8/18* | (2009.01) | |
| *H04W 88/06* | (2009.01) | |

(52) U.S. Cl.
CPC ... *H04B 2201/70979* (2013.01); *H04W 8/183* (2013.01); *H04W 72/1215* (2013.01); *H04W 88/06* (2013.01)

(56) References Cited

U.S. PATENT DOCUMENTS

| | | | |
|---|---|---|---|
| 2007/0178875 A1* | 8/2007 | Rao | H04W 52/028 455/343.1 |
| 2010/0112962 A1* | 5/2010 | van Zeijl | H04B 1/0475 455/77 |
| 2011/0217969 A1 | 9/2011 | Spartz et al. | |
| 2013/0079025 A1 | 3/2013 | Chen et al. | |
| 2013/0303181 A1 | 11/2013 | Rajurkar et al. | |
| 2014/0274201 A1 | 9/2014 | Sun et al. | |
| 2014/0293847 A1* | 10/2014 | Tsai | H04L 5/14 370/281 |
| 2015/0079986 A1 | 3/2015 | Nayak et al. | |
| 2015/0282057 A1* | 10/2015 | Li | H04B 7/0871 455/552.1 |

OTHER PUBLICATIONS

International Search Report & Written Opinion, Application No. PCT/US2015/041958, dated Oct. 29, 2015, 11 pages.

\* cited by examiner

CONCURRENT DATA COMMUNICATION AND VOICE CALL MONITORING USING DUAL SIM

PRIORITY INFORMATION

This application claims priority to U.S. provisional patent application Ser. No. 62/029,415, entitled "Concurrent Data Communication and Voice Call Monitoring Using Dual SIM," filed Jul. 25, 2014, which is hereby incorporated by reference in its entirety as though fully and completely set forth herein.

TECHNICAL FIELD

The present application relates to wireless devices, and more particularly to a system and method for maintaining concurrent cellular communications connections on a single radio.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

New and improved cellular radio access technologies (RATs) are sometimes deployed in addition to existing RATs. For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and UE devices may transition between RATs as services or coverage may require. For example, in some deployments, LTE networks are not capable of supporting voice calls. Thus, for example when a UE device receives or initiates a circuit switched voice call while connected to an LTE network that does not support voice calls, the UE device can transition to a legacy network, such as one that uses a GSM (Global System for Mobile Communications) RAT that supports voice calls, among other possibilities.

Some UE devices use a single radio to support concurrent operation on multiple cellular RATs. For example, some UE devices use a single radio to support operation on both LTE and GSM networks. The use of a single radio for multiple RATs makes transitioning between networks, such as in response to a page message for an incoming voice call or circuit switched service, more complex. In addition, the use of a single radio for multiple RATs presents certain power usage and performance issues.

For these reasons, existing UE devices that use a single radio to support concurrent operation on multiple RATs may sometimes use a variety of first RATs (e.g. LTE, Advanced LTE, etc.) for data, but are constrained to GSM for voice.

Therefore, it would be desirable to provide additional options for maintaining multiple concurrent cellular communication connections on a single radio.

SUMMARY

Embodiments described herein relate to a User Equipment (UE) device and associated method concurrently performing data communication according to a first RAT and voice call monitoring according to a second RAT. The UE may include a first radio (e.g., may have a single radio for cellular communication) for performing both the data communication of the first RAT and the voice call monitoring of the second RAT. In some scenarios, the first and second RATs may be the same.

A user equipment device (UE) is disclosed, including a first subscriber identity module (SIM), a second SIM, and a radio coupled to the first SIM and the second SIM. The radio may be configured to perform data communication using a first RAT. The data communication may be supported by the first SIM. The radio may be further configured to perform a paging function for a voice communication using a second RAT. The second RAT may be a RAT other than Global System for Mobile Communications (GSM). The paging function may be supported by the second SIM. The performing the paging function may be performed concurrently with the performing the data communication. The radio may include shared physical layer resources that are shared between the performing the data communication and the performing the paging function. The shared physical layer resources may include a software defined radio configured to decode data signals of the data communication and paging signals of the paging function.

In some embodiments, the software defined radio may be further configured to demodulate data signals of the data communication and paging signals of the paging function.

In other embodiments, the shared physical layer resources may include a Rake receiver. A plurality of fingers of the Rake receiver may be utilized for demodulation of data signals of the data communication. Additionally, a subset of the plurality of fingers of the Rake receiver may be reconfigured for demodulation of paging signals of the paging function during paging reception cycles.

In other embodiments, the shared physical layer resources include resources configured to decode data signals of the data communication and paging signals of the paging function. The radio may further include separate resources configured to demodulate the received signals. For example, the radio may include a first Rake receiver configured to demodulate data signals of the data communication, and a second Rake receiver configured to demodulate paging signals of the paging function. The second Rake receiver may include fewer fingers than the first Rake receiver.

In some embodiments, the first RAT may be the same as the second RAT. In some such embodiments, the radio may be configured to perform the data communication using a first instantiation of a protocol stack for the first RAT, and to perform the paging function using a second instantiation of the protocol stack for the same RAT.

A method is disclosed, in which a UE may receive, via a cellular radio of the UE, a data signal of a first radio access technology (RAT). The first RAT may be supported by a first subscriber identity module (SIM). The UE may further receive, via the cellular radio, a paging signal of a second RAT. The second RAT may be supported by a second SIM. The UE may concurrently demodulate the data signal and the paging signal. The UE may also concurrently decode the data signal and the paging signal at the physical layer using a software defined radio (SDR). The SDR may be configured to decode the data signal and the paging signal in a time-interleaved fashion.

In some embodiments, the concurrently demodulating the data signal and the paging signal may be performed by shared physical layer resources that are shared between the first RAT and the second RAT. For example, the shared physical layer resources may include the SDR. The concurrently demodulating the data signal and the paging signal may include the SDR demodulating the data signal and the paging signal in a time-interleaved fashion. As another example, the shared physical layer resources may include a Rake receiver having a plurality of fingers. The concurrently demodulating the data signal and the paging signal may include the Rake receiver utilizing all of the fingers to demodulate signals from the first RAT when no signal from the second RAT is present, and utilizing a first subset of the fingers to demodulate signals from the first RAT and a second subset of the fingers to demodulate signals from the second RAT when a paging signal from the second RAT is present.

A non-transitory computer-accessible memory medium is disclosed, which stores program instructions executable by a processor of a communication device. The program instructions may cause the communication device to perform steps similar to those of the methods described above.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

Figure 1:
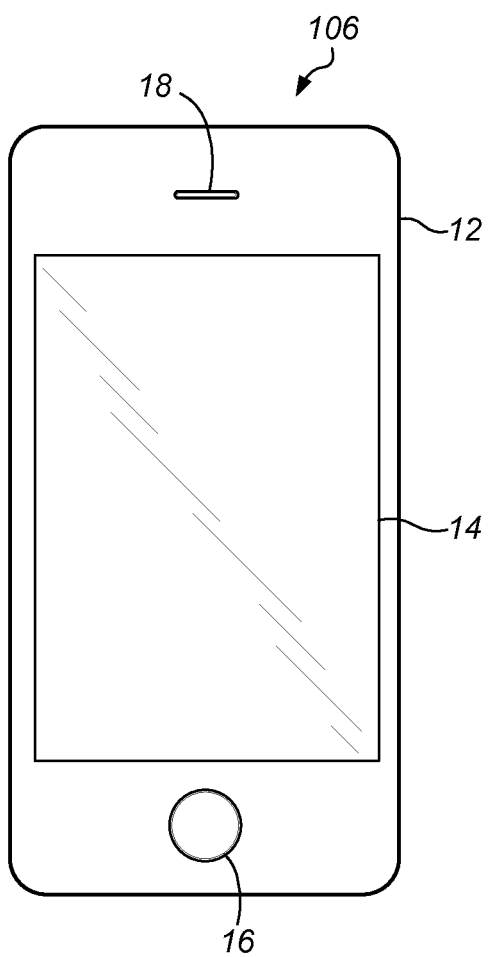
FIG. 1 illustrates an example user equipment (UE) according to some embodiments.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2
GSM: Global System for Mobile Communications
LTE: Long Term Evolution
RAT: Radio Access Technology
RX: Receive
TX: Transmit
UMTS: Universal Mobile Telecommunications System
UMTS-FDD: UMTS-Frequency Division Duplexing
UMTS-TDD: UMTS-Time Division Duplexing Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or include openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), Advanced LTE, and/or other RATs. For example, the UE 106 may support at least two radio access technologies such as LTE and GSM. Various different or other RATs may be supported as desired.

The UE 106 may include one or more antennas. The UE 106 may also include any of various radio configurations, such as various combinations of one or more transmitter chains (TX chains) and one or more receiver chains (RX chains). For example, the UE 106 may include a radio that supports two or more RATs. The radio may include a single TX (transmit) chain and a single RX (receive) chain. Alternatively, the radio may include a single TX chain and two RX chains that operate on the same frequency. In another embodiment, the UE 106 includes two or more radios, i.e., two or more TX/RX chains (two or more TX chains and two or more RX chains).

In some embodiments described herein, the UE 106 includes two antennas which communicate using one or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also include a second antenna that is coupled to a second RX chain.

In some embodiments, the two receiver chains operate as a pair and time multiplex among two or more RATs, such as LTE and one or more other RATs such as GSM or CDMA1×. In some embodiments described herein the UE 106 includes one transmitter chain and two receiver chains, wherein the transmitter chain and the two receiver chains (acting as a pair) time multiplex between two (or more) RATs, such as LTE and UMTS-FDD, or between two connections using a single RAT, such as UMTS-FDD.

Each antenna may receive a wide range of frequencies such as from 600 MHz up to 3 GHz. Thus, for example, the local oscillator of the two receiver chains may tune to a specific frequency such as an LTE frequency band, where the first receiver chain receives samples from antenna 1 and the second receiver chain receives samples from antenna 2, both on the same frequency (e.g., if they use the same local oscillator). The wireless circuitry in the UE 106 can be configured in real time depending on the desired mode of operation for the UE 106.

Figure 2:
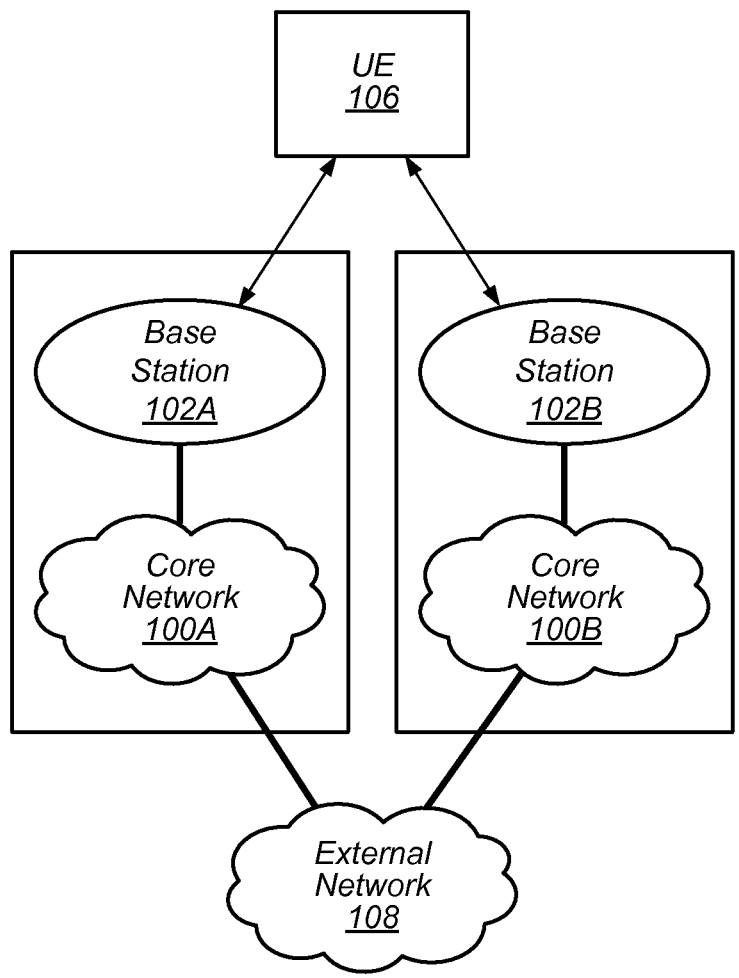
FIG. 2 illustrates an example wireless communication system where a UE communicates with two base stations using two different RATs, according to some embodiments.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS, LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1×RTT, and/or any other combination of RATs) might be coupled to a core network that also supports the different cellular communication technologies. In some embodiments, the UE 106 may be configured to use a first RAT that is a packet-switched technology (e.g., LTE) and a second RAT that is a circuit-switched technology (e.g., GSM or 1×RTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
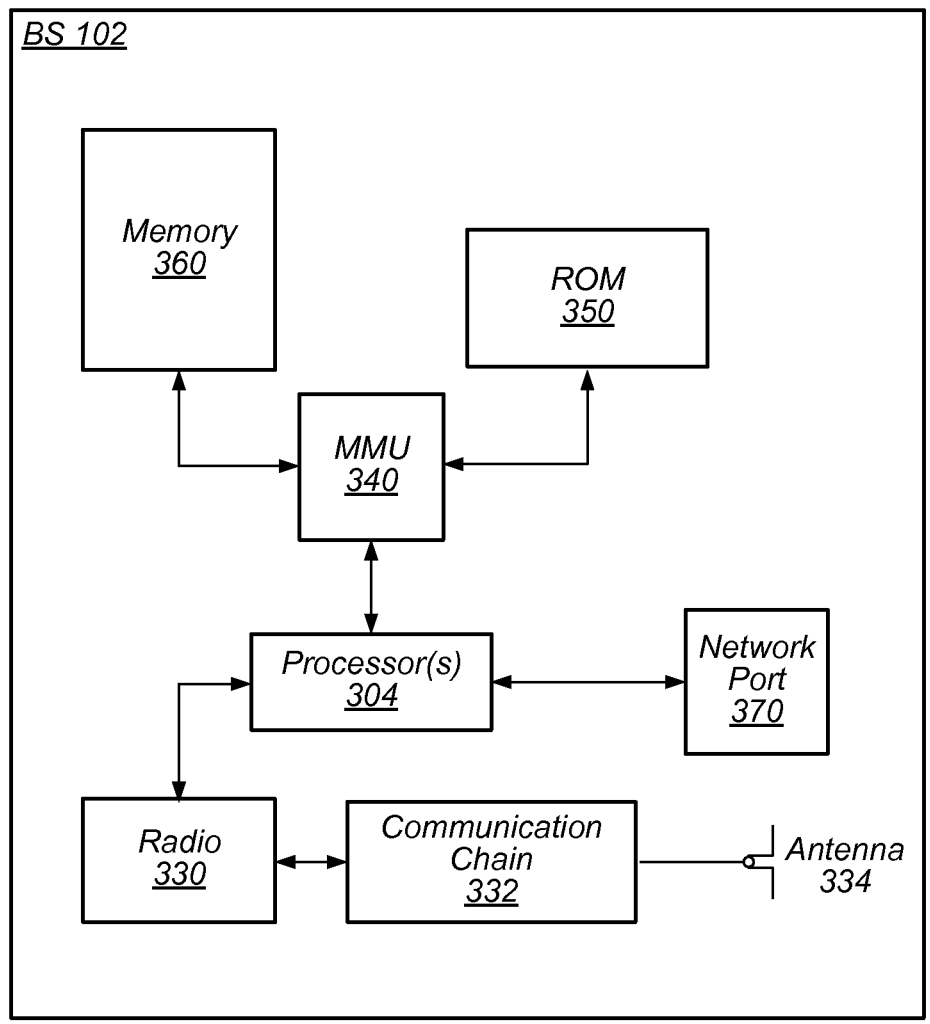
FIG. 3 is an example block diagram of a base station, according to some embodiments.

FIG. 3—Base Station

FIG. 3 illustrates an exemplary block diagram of a base station 102. It is noted that the base station of FIG. 3 is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 504 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices 106 serviced by the cellular service provider).

The base station 102 may include at least one antenna 334. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various RATs, including, but not limited to, LTE, GSM, WCDMA, CDMA2000, etc.

The processor(s) 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

Figure 4:
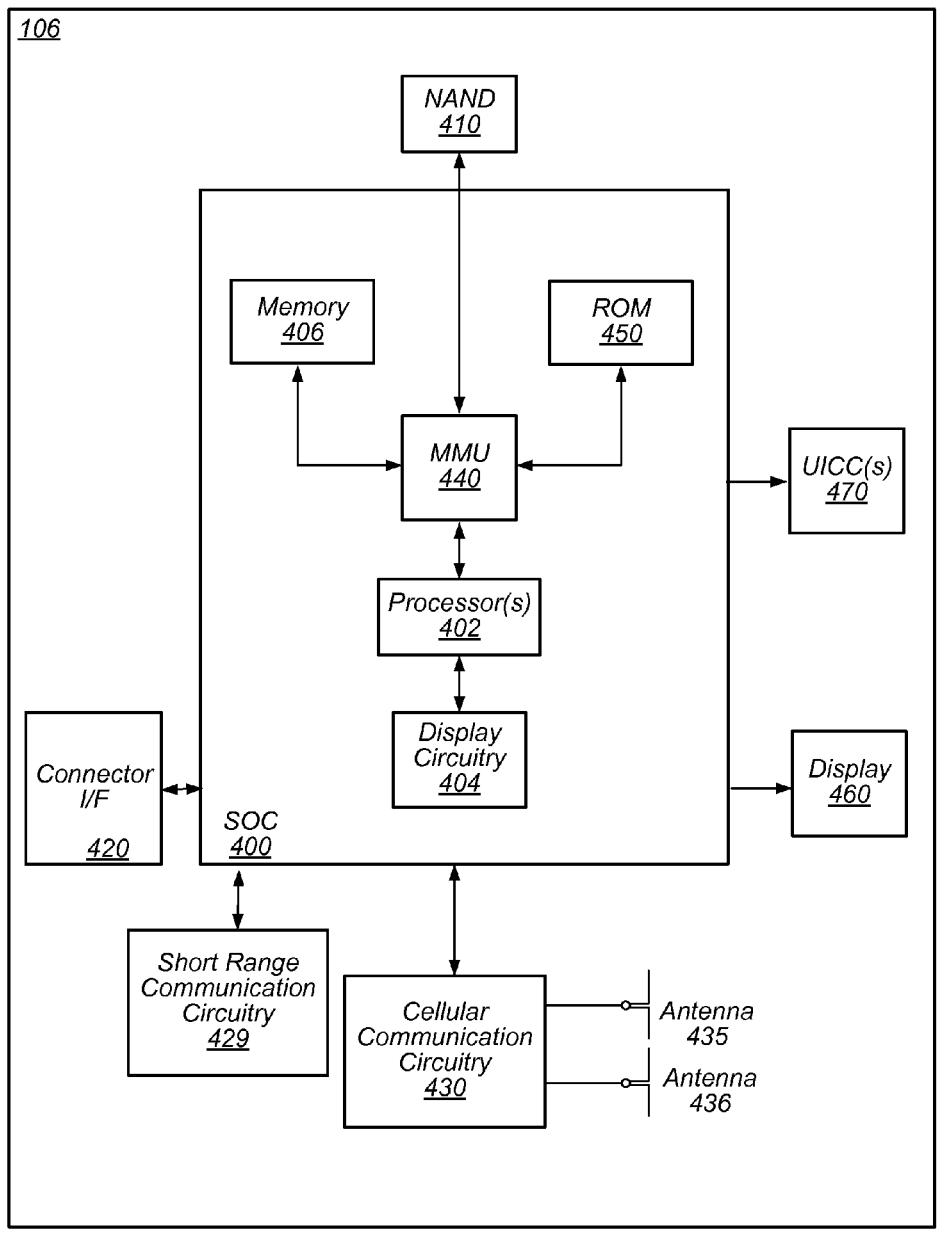
FIG. 4 is an example block diagram of a UE, according to some embodiments.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The UE 106 may further include one or more smart cards 470 that include SIM (Subscriber Identity Module) functionality, such as one or more UICC(s) (Universal Integrated Circuit Card(s)) cards 470. The cellular communication circuitry 430 may couple to one or more antennas, preferably at least two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In some embodiments, as noted above, the UE 106 includes at least one smart card 470, such as a UICC 470, which executes one or more Subscriber Identity Module (SIM) applications and/or otherwise implements SIM functionality. The at least one smart card 470 may be only a single smart card 470, or the UE 106 may include two or more smart cards 470. Each smart card 470 may be embedded, e.g., may be soldered onto a circuit board in the UE 106, or each smart card 470 may be implemented as a removable smart card. Thus the smart card(s) 470 may be one or more removable smart cards (such as UICC cards, which are sometimes referred to as "SIM cards"), and/or the smart card(s) 470 may be one or more embedded cards (such as embedded UICCs (eUICCs), which are sometimes referred to as "eSIMs" or "eSIM cards"). In some embodiments (such as when the smart card(s) 470 include an eUICC), one or more of the smart card(s) 470 may implement embedded SIM (eSIM) functionality; in such an embodiment, a single one of the smart card(s) 470 may execute multiple SIM applications. Each of the smart card(s) 470 may include components such as a processor and a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 470 may include two embedded smart cards 470, two removable smart cards 470, or a combination of one embedded smart card 470 and one removable smart card 470. Various other SIM configurations are also contemplated.

As noted above, in some embodiments, the UE 106 may include two or more smart cards 470, each implementing SIM functionality. The inclusion of two or more SIM smart cards 470 in the UE 106 may allow the UE 106 to support two different telephone numbers and may allow the UE 106 to communicate on corresponding one or more respective networks. For example, a first smart card 470 may include SIM functionality to support a first RAT such as LTE, and a second smart card 470 may include SIM functionality to support a second RAT such as UMTS-FDD. Other implementations and RATs are of course possible. Where the UE 106 includes two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In other embodiments, the UE 106 may support Dual SIM Dual Standby (DSDS) functionality. The DSDS functionality may allow either of the two smart cards 470 in the UE 106 to be on standby waiting for a voice call and/or data connection. In DSDS, when a call/data is established on one SIM 470, the other SIM 470 is no longer active. In some embodiments, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 includes at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 and/or the radio 430 of the UE device 106 may be configured to implement part or all of the features described herein, e.g., by executing program instructions stored on a memory medium (e.g., a non-transitory computer-readable memory medium). Alternatively (or in addition), one or more of the processor 402 and the radio 430 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 436, 440, 450, 460, 470 may be configured to implement part or all of the features described herein.

Figure 5A:
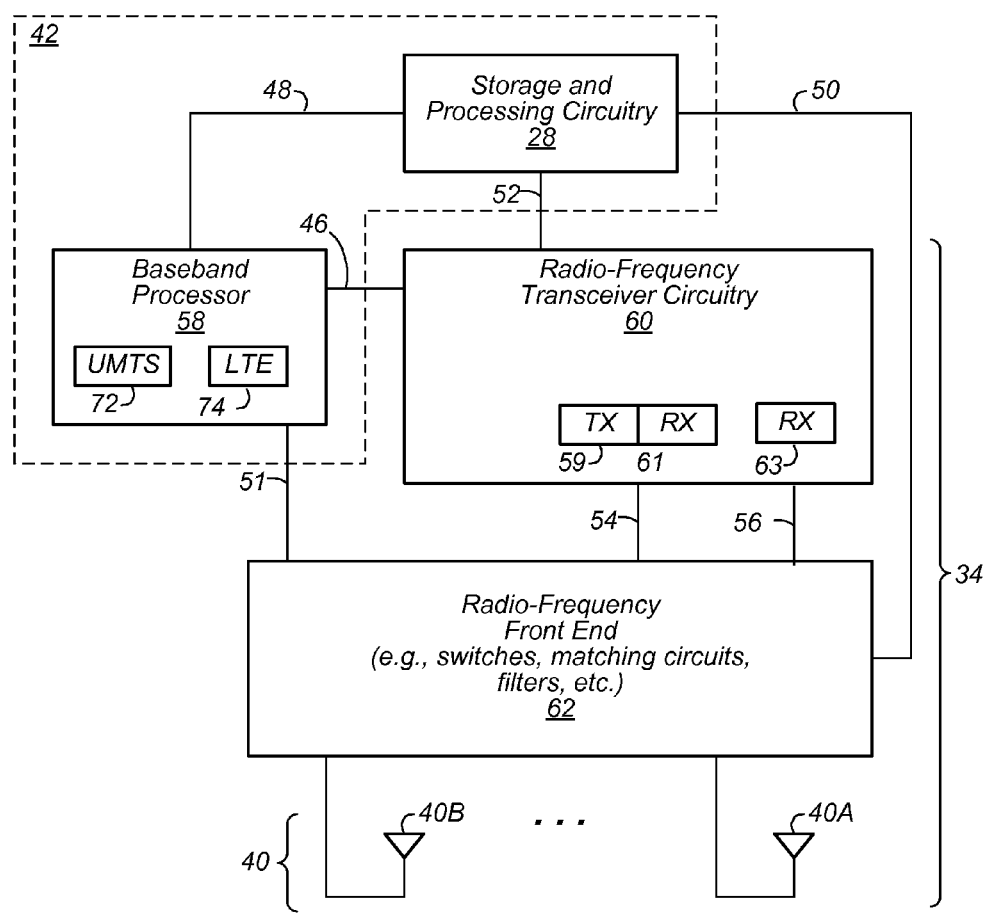
FIGS. 5A and 5B are example block diagrams of wireless communication circuitry in the UE, according to some embodiments.
Figure 5B:
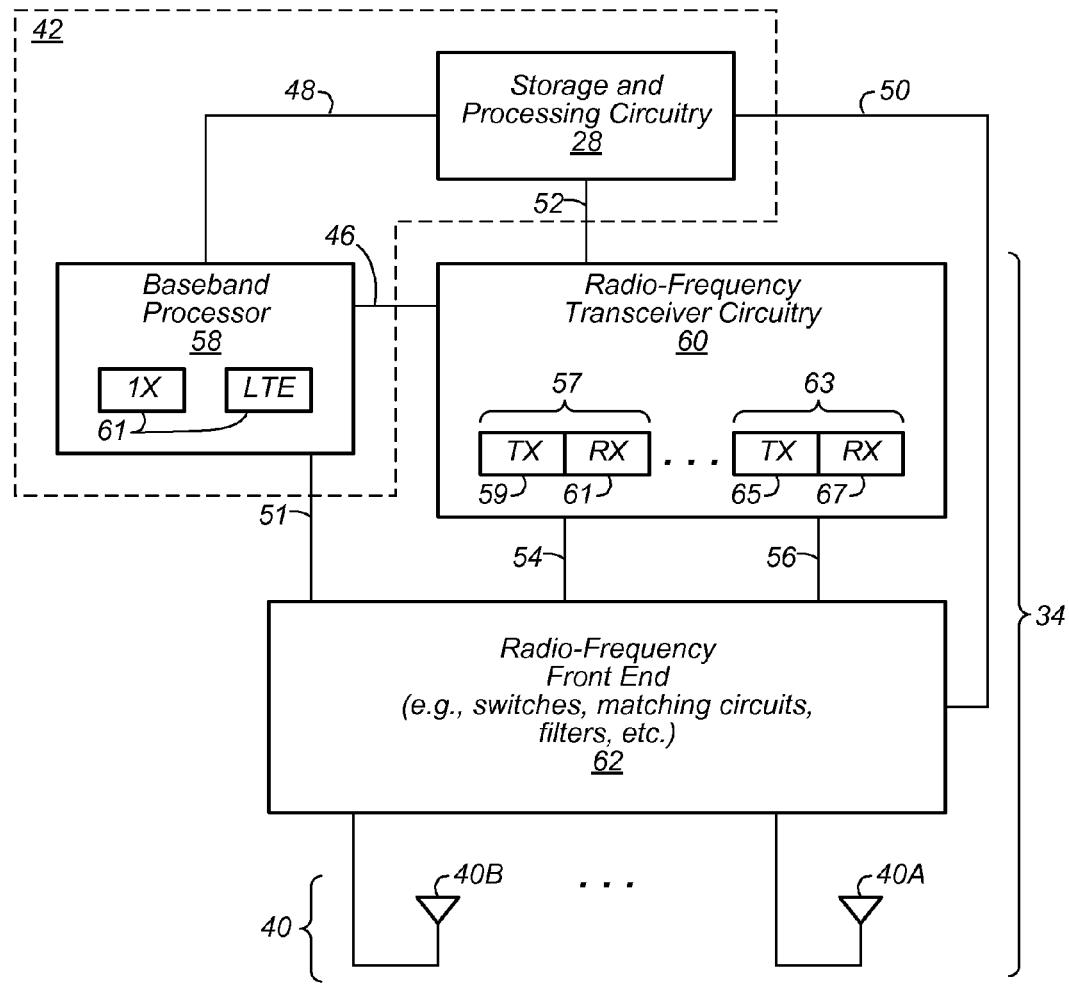

FIGS. 5A and 5B—UE Transmit/Receive Logic

FIG. 5A illustrates a portion of UE 106 according to some embodiments. As shown, UE 106 may include control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may include software and/or logic for handling various different RATs, such as UMTS-FDD logic 72 and LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 includes transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may include only a single TX chain and only a single RX chain, also a single radio embodiment. Thus the term "radio" may be defined to have the broadest scope of its ordinary and accepted meaning, and includes the circuitry normally found in a radio, including either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may include their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also include two or more TX chains and two or more RX chains. For example, FIG. 5B shows an embodiment with a first radio 57 including TX chain 59 and RX chain 61 and a second radio 63 including a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a UMTS-FDD paging channel for incoming UMTS-FDD pages, one or both of the antennas may be temporarily used in receiving UMTS-FDD paging channel signals.

Control circuitry 42 may be used to execute software for handling more than one radio access technology. For example, baseband processor 58 may include memory and control circuitry for implementing multiple protocol stacks such as a UMTS-FDD protocol stack 72 and an LTE protocol stack 74. Thus, protocol stack 72 may be associated with a first radio access technology such as UMTS-FDD (as an example), and protocol stack 74 may be associated with a second radio access technology such as LTE (as an example). During operation, UE 106 may use UMTS-FDD protocol stack 72 to handle UMTS-FDD functions and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In some embodiments, one or both of the protocol stacks may be configured to implement the methods described in the flowcharts below.

In some embodiments of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support traffic of multiple RATs.

A first RAT, such as LTE, for example, may generally be used to carry data traffic, whereas a second radio access technology, such as UMTS-FDD, for example, may generally be used to carry voice traffic. To ensure that voice calls are not interrupted due to data traffic, voice operations may take priority over data operations. To ensure that operations such as monitoring a UMTS-FDD paging channel for incoming paging signals do not unnecessarily disrupt LTE operations, control circuitry 42 can, whenever possible, configure the wireless circuitry of UE 106 so that wireless resources are shared between LTE and UMTS-FDD functions.

When a user has an incoming UMTS-FDD call, the UMTS-FDD network may send UE 106 a paging indication (PI) on the UMTS-FDD paging indication channel (PICH) using base station 102. The PI may identify a paging channel (PCH) that will contain paging information for UE 106. In response to the PI, the UE 106 may demodulate and decode the identified PCH to receive the paging information. When UE 106 receives paging information, UE 106 can take suitable actions (e.g., call establishment procedures) to set up and receive the incoming UMTS-FDD call.

Performing Concurrent Data Communication and Voice Call Monitoring

As discussed above, a UE may use a single radio to concurrently maintain two different communication connections, each supported by one of two SIMs. For example, a first connection may be used for data communications, and a second connection may be used for voice communications. In this example, if a voice call is not currently taking place, the voice communication connection may require only monitoring of periodic paging information. In such scenarios, the UE may be considered as maintaining two connections using the same radio, even though it may only communicate using one connection at a time.

In some scenarios, a UE may use a single radio to maintain two connections using the same RAT and/or the same network. Alternatively, a UE may use a single radio to maintain two connections using two different RATs.

A RAT used for the voice connection may be a RAT that uses continuous transmission on the air interface, such as UMTS-FDD or 1× (CDMA2000 1×EV-DO). In various embodiments, a RAT used for the data connection may also be a RAT that uses continuous transmission on the air interface (e.g., the voice connection and the data connection may use the same RAT). In other embodiments, the RAT used for the data connection may instead be a RAT that uses discontinuous transmission on the air interface, such as UMTS-TDD (e.g. TDS or TD-SCDMA), or LTE.

Concurrently maintaining two connections using a single radio may be facilitated by a physical layer configured to share resources between the two connections. For example, the shared physical layer resources may be capable of demodulating and/or decoding physical layer channels of both connections. Such shared physical layer resources may include, for example, a software defined radio (SDR) module that may be shared between two connections. Where both the voice connection and the data connection use a RAT having continuous transmission on the air interface, the radio may also include parallel hardware for decoding physical layer channels, in addition to the SDR. Alternatively, where one or more of the connections use a RAT having discontinuous transmission on the air interface, the shared physical layer resources may include shared hardware in addition to, or instead of, a shared SDR. For example, the shared physical layer resources may include a shared Rake receiver, as discussed below.

In some scenarios, a shared SDR may allow DSDS functionality where a single radio is used to maintain two connections using a single RAT, such as UMTS-FDD. In this scenario, a first UMTS-FDD connection may be used for data communications, and a second UMTS-FDD connection may be used for voice communications. While no voice call is currently taking place, maintaining the second UMTS-FDD connection may require only monitoring of paging information. In this scenario, the SDR may be configured to demodulate and decode both data signals of the first connection (e.g., Dedicated Physical Channels (DPCH) and/or High Speed (HS) channels) and paging signals of the second connection (e.g. PICH and PCH), e.g., as follows.

The UE may capture RF samples for the PICH of the second connection, and process the samples in the SDR to decode the PI. During this time, the UE may also receive RF samples for the DPCH and HS channels (or other physical channels) of the first connection. The RF samples for the DPCH and HS channels may be received on the same or a different receiver than the RF samples for the PICH. The SDR can maintain separate channel information parameters for both UMTS-FDD connections, e.g., in software memories. The SDR may time-multiplex the demodulation of the PICH symbols and the demodulation of symbols from the DPCH and HS channels, using the separate channel information parameters. Decoding of the DPCH and HS channel and PICH symbols may also be performed in a time-multiplexed fashion. In other words, DPCH and HS data and PI data may be decoded as separate streams.

If the decoded PI indicates that a PCH will contain paging information for the UE, the SDR may similarly demodulate and decode the Secondary Common Control Physical Channel (S-CCPCH) containing the indicated PCH. The SDR may also continue to demodulate and decode the DPCH and HS channels of the first connection in a time-interleaved fashion. In some embodiments, the HS transport channel of the first connection may also be processed by the SDR in a time-multiplexed fashion, alongside DPCH and HS channels of the first connection. In other embodiments, the processing of the HS transport channel may be downgraded during processing of the S-CCPCH of the second connection, e.g., to reduce processing requirements.

In this scenario, the channel demodulating and decoding may thus be performed entirely by the SDR, and may not require dedicated hardware resources.

Because this scenario allows DSDS functionality, when the second connection engages in a voice call (either mobile terminated or mobile originated), the first connection may be suspended and resources being used for the first connection may be switched to support voice call operation on the second connection.

In another scenario, a shared SDR may allow DSDA functionality where a single radio is used to maintain two connections using two different RATs. For example, a first connection may use LTE, supported by a first SIM, and a second connection may use UMTS-FDD, supported by a second SIM. In this scenario, the SDR may again perform demodulation and decoding of data signals of the first connection (e.g., LTE physical channels) and paging signals of the second connection (e.g. PICH and PCH) in a manner similar to that described above.

In yet another scenario, a shared SDR may allow DSDA functionality where a single radio is used to maintain two connections using a single RAT, such as UMTS-FDD. Because some RATs, such as UMTS-FDD, utilize continuous reception, this may utilize two instantiations of a protocol stack of the RAT. However, the demodulation and decoding performed in the physical layer may still be done by shared physical layer resources, such as a shared SDR, as discussed above. In this scenario, the signals corresponding to each of the two connections may be processed as a separate stream, as discussed above, and each of the two streams may be directed to one of the protocol stacks.

As another example, the shared physical layer resources may include a shared Rake receiver instead of, or in addition to, the shared SDR. The shared Rake receiver may be configured to perform demodulation of PICH/SCCPCH alongside the demodulation of DPCH and HS dependent channels. During paging reception cycles, the least contributing Rake receiver fingers may be taken away from DPCH/HS dependent channels and reconfigured with the timing information associated with the PICH/SCCPCH. Since the demodulation time and decode time of the PICH/SCCPCH is expected to be short, the degradation of the DPCH/HS dependent channels is expected to be minimal. In this example, channel decoding may be done in time-multiplexed fashion, substantially as described above.

As yet another example, the shared physical layer resources may include resources for decoding, while each connection utilizes separate physical layer resources for demodulating. For example, the radio may include a first Rake receiver configured to demodulate signals (e.g. data signals) of the first connection. The radio may further include a second Rake receiver configured to demodulate signals (e.g., paging signals) of the second connection. The second Rake receiver may be a slim version of a Rake receiver, e.g., configured to demodulate only paging signals, such as PICH, PCCPCH and SCCPCH. The number of Rake receiver fingers may be fewer than that of the first Rake receiver, since the second Rake receiver may not be required to handle soft handover. Buffers of the Rake receiver may also be made smaller. With this option, demodulation may be done in parallel for the PICH/SCCPCH and the DPCH/HS dependent channels. However, channel decoding may be time-multiplexed between both connections, as described above.

As yet another example, the shared physical layer resources may include resources for demodulating, while each connection utilizes separate physical layer resources for decoding. For example, the shared resources may include a shared SDR and/or a shared Rake receiver configured to perform demodulation of PICH/SCCPCH alongside the demodulation of DPCH and HS dependent channels. However, decoding of the signals for each connection may be performed in parallel. For example, the radio may include hardware accelerators for decoding DPCH and HS dependent channels.

In any of the above examples, searching and measurement may be an asynchronous operation. If hardware is used, the hardware may be configured to perform searching and measurement for both connections in a time-multiplex fashion. If a SDR is used, the SDR may maintain separate lists and separate filtering and measurements for each connection.

If the two connections use the same RAT on the same network, further optimization may be performed by sharing measurement across the connections for the same cells. For example, this may be applicable where a mobile virtual network operator shares the same network as the voice subscription.

Figure 6:
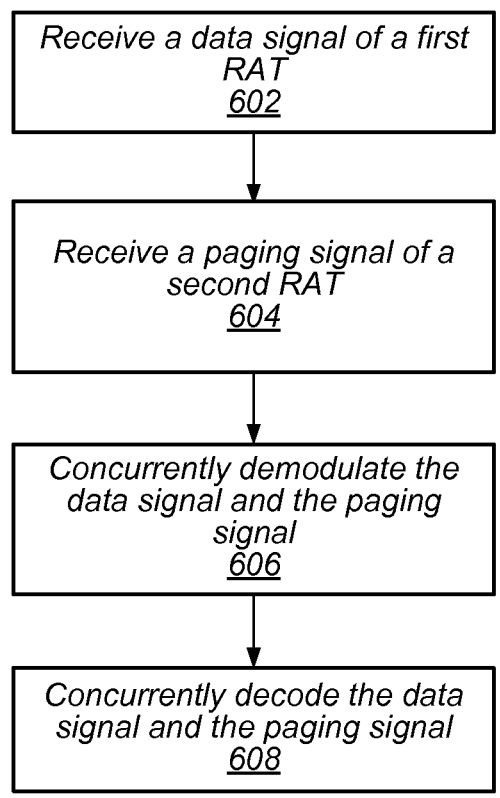
FIG. 6 is a flowchart diagram illustrating a method for performing concurrent data communication and voice call monitoring using a single radio, according to some embodiments.

FIG. 6—Method for Concurrent Data Communication and Voice Call Monitoring

FIG. 6 is a flowchart diagram illustrating a method for performing concurrent data communication and voice call monitoring using a single radio, according to some embodiments. The method shown in FIG. 6 may be used in conjunction with any of the systems or devices shown in the above Figures, among other devices. For example, the method may be performed by a UE, such as the UE 106. In various embodiments, some of the method elements shown may be performed concurrently, in a different order than shown, or may be omitted. Note also that additional method elements may also be performed as desired. The method may be performed as follows.

As shown, in 602, the UE may receive a data signal of a first RAT. The data signal may be received via a cellular radio of the UE, such as the radio 430. The first RAT may be supported by a first SIM of the UE. In some embodiments the first RAT may be UMTS-FDD, although other RATs are also envisioned. The data signal may include, e.g., a UMTS-FDD DPCH or HS channel.

In 604, the UE may receive a paging signal of a second RAT. The paging signal may be received via the cellular radio. The second RAT may be supported by a second SIM. In some embodiments, the second RAT may be the same as the first RAT. In other embodiments, the second RAT may be different than the first RAT. The paging signal may include, e.g., a UMTS-FDD PICH or S-CCPCH.

In 606, the UE may concurrently demodulate the data signal and the paging signal. This may be performed by physical layer resources that are shared between the first RAT and the second RAT. For example, the shared physical layer resources may include a SDR. In such an example, the concurrently demodulating the data signal and the paging signal may include the SDR demodulating the data signal and the paging signal in a time-interleaved fashion. As another example, the shared physical layer resources may include a Rake receiver. The rake receiver may have a plurality of fingers for signal demodulation. The Rake receiver may be configured to utilize all of the fingers to demodulate signals from the first RAT when no signal from the second RAT is present (e.g., when only signals from the second RAT are present). However, when paging signals of the second RAT are present, the fingers may be reconfigured such that a first subset of the fingers may be used to demodulate signals from the first RAT, and a second subset of the fingers may be used to demodulate the paging signals from the second RAT. For example, the second subset of fingers may include the fingers that were contributing the least to demodulation of the signals from the first RAT.

In 608, the UE may concurrently decode the data signal and the paging signal. This may be performed by physical layer resources that are shared between the first RAT and the second RAT. For example, the shared physical layer resources may include a SDR. In such an example, the concurrently decoding the data signal and the paging signal may include the SDR decoding the data signal and the paging signal in a time-interleaved fashion.

In some scenarios, the shared physical layer resources may include resources configured to decode data signals of the data communication and paging signals of the paging function, but not to demodulate the signals. For example, the radio may include separate resources to demodulate the two RATs. For example, the radio may include a first Rake receiver configured to demodulate data signals of the data communication. The radio may further include a second Rake receiver configured to demodulate paging signals of the paging function. The second Rake receiver may include fewer fingers than the first Rake receiver, and/or may have smaller buffers.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a first subscriber identity module (SIM);
a second SIM; and
a radio coupled to the first SIM and the second SIM, the radio comprising a Rake receiver and at least one processor, wherein the radio is configured to:
perform data communication using a first radio access technology (RAT), the data communication supported by the first SIM; and
perform a paging function for a voice communication using a second RAT, wherein the second RAT is not Global System for Mobile Communications (GSM), the paging function supported by the second SIM, wherein the performing the paging function is performed concurrently with the performing the data communication;
wherein the at least one processor is configured to implement a software defined radio (SDR) to decode data signals of the data communication and paging signals of the paging function;
wherein a plurality of fingers of the Rake receiver are configured for demodulation of data signals of the data communication, and wherein, during paging reception cycles, a subset of the plurality of fingers of the Rake receiver are configured for demodulation of paging signals of the paging function, while the remaining fingers of the plurality of fingers of the Rake receiver remain configured for demodulation of data signals of the data communication.

2. The UE of claim 1, wherein the at least one processor is further configured to implement the SDR to demodulate the data signals of the data communication and the paging signals of the paging function.

3. The UE of claim 1, wherein the first RAT is the same as the second RAT.

4. The UE of claim 3, wherein the first RAT and the second RAT are Universal Mobile Telecommunications System-Frequency Division Duplexing (UMTS-FDD).

5. The UE of claim 3, wherein the radio is configured to perform the data communication using a first instantiation of a protocol stack for the first RAT, and to perform the paging function using a second instantiation of the protocol stack for the same RAT.

6. A method, comprising:
by a user equipment device (UE) comprising a cellular radio:
receiving, via the cellular radio, a data signal of a first radio access technology (RAT) supported by a first subscriber identity module (SIM);
receiving, via the cellular radio, a paging signal of a second RAT supported by a second SIM;
concurrently demodulating the data signal and the paging signal, wherein the concurrently demodulating the data signal and the paging signal comprises:
utilizing all of a plurality of fingers of a Rake receiver to demodulate signals from the first RAT when no signal from the second RAT is present; and
utilizing a first subset of the plurality of fingers of the Rake receiver to demodulate signals from the first RAT and a second subset of the fingers to demodulate signals from the second RAT when a paging signal from the second RAT is present; and
concurrently decoding the data signal and the paging signal at the physical layer using a software defined radio (SDR) implemented by a processor of the UE, wherein the SDR is configured to decode the data signal and the paging signal in a time-interleaved fashion.

7. The method of claim 6, wherein the concurrently demodulating the data signal and the paging signal is performed by shared physical layer resources that are shared between the first RAT and the second RAT.

8. The method of claim 7, wherein the concurrently demodulating the data signal and the paging signal comprises the SDR demodulating the data signal and the paging signal in a time-interleaved fashion.

9. The method of claim 6, wherein the first RAT is the same as the second RAT.

10. The method of claim 9, wherein the first RAT and the second RAT are Universal Mobile Telecommunications System-Frequency Division Duplexing (UMTS-FDD).

11. A non-transitory computer-accessible memory medium comprising program instructions executable by a processor of a communication device, the program instructions causing the communication device to:
 receive a data signal of a first radio access technology (RAT) supported by a first subscriber identity module (SIM);
 receive a paging signal of a second RAT supported by a second SIM;
 concurrently demodulate the data signal and the paging signal, the concurrently demodulating the data signal and the paging signal comprising:
  utilizing all of a plurality of fingers of a Rake receiver to demodulate signals from the first RAT when no signal from the second RAT is present; and
  utilizing a first subset of the plurality of fingers of the Rake receiver to demodulate signals from the first RAT and a second subset of the fingers to demodulate signals from the second RAT when a paging signal from the second RAT is present; and
 concurrently decode the data signal and the paging signal at the physical layer via a software defined radio (SDR) implemented by a processor of the communication device, wherein the SDR is configured to decode the data signal and the paging signal in a time-interleaved fashion.

12. The non-transitory computer-accessible memory medium of claim 11, wherein concurrently demodulating the data signal and the paging signal is performed by shared physical layer resources that are shared between the first RAT and the second RAT.

13. The non-transitory computer-accessible memory medium of claim 12, wherein concurrently demodulating the data signal and the paging signal comprises the SDR demodulating the data signal and the paging signal in a time-interleaved fashion.

14. The non-transitory computer-accessible memory medium of claim 11, wherein the first RAT is the same as the second RAT.

15. An apparatus, comprising:
 a first receive chain configured to receive a data signal of a first radio access technology (RAT);
 a second receive chain configured to receive a paging signal of a second RAT concurrently with the first receive chain receiving the data signal of the first RAT, wherein the second RAT is not Global System for Mobile Communications (GSM);
 a Rake receiver having a plurality of fingers, wherein, at a first time, during a paging reception cycle, a first subset of the fingers are configured to demodulate the paging signal and a second subset of the fingers are configured to concurrently demodulate the data signal, and wherein, at a second time, not during the paging reception cycle, the first subset of fingers and the second subset of fingers are configured to demodulate the data signal.

16. The apparatus of claim 15, further comprising:
 a first subscriber identity module (SIM) configured to support the first RAT;
 a second SIM configured to support the second RAT.

17. The apparatus of claim 15, further comprising:
 a software defined radio configured to decode the data signal and the paging signal at the physical layer in a time-interleaved fashion.

18. The apparatus of claim 15, further comprising:
 a first hardware accelerator configured to decode the data signal; and
 a second hardware accelerator configured to decode the paging signal.

19. The apparatus of claim 15, wherein the first RAT is the same as the second RAT.

20. The apparatus of claim 19, wherein the first RAT and the second RAT are Universal Mobile Telecommunications System-Frequency Division Duplexing (UMTS-FDD).

* * * * *